United States Patent [19]
Ono et al.

[11] Patent Number: 6,082,904
[45] Date of Patent: Jul. 4, 2000

[54] SLIDING BEARING

[75] Inventors: Akira Ono; Hideyumi Matsumura; Masayuki Niwa; Shoji Nawa; Takayuki Shibayama, all of Nagoya, Japan

[73] Assignee: Daido Metal Company Ltd., Nagoya, Japan

[21] Appl. No.: 09/020,295

[22] Filed: Feb. 6, 1998

[30] Foreign Application Priority Data

Feb. 21, 1997 [JP] Japan ..................................... 9-054108

[51] Int. Cl.[7] ..................................................... F16C 33/10
[52] U.S. Cl. ........................... 384/291; 384/283; 384/292
[58] Field of Search .................................. 384/276, 283, 384/286, 287, 288, 291, 292

[56] References Cited

U.S. PATENT DOCUMENTS

| | | | |
|---|---|---|---|
| 4,461,585 | 7/1984 | Mahrus et al. ........................... | 384/288 |
| 4,678,348 | 7/1987 | Tielemans et al. ................. | 384/292 X |
| 5,000,586 | 3/1991 | Daxer et al. ............................. | 384/283 |
| 5,238,311 | 8/1993 | Katou et al. ......................... | 384/292 X |
| 5,284,393 | 2/1994 | Duarte, Jr. et al. ..................... | 384/291 |

FOREIGN PATENT DOCUMENTS

| | | | |
|---|---|---|---|
| 59-073620 | 4/1984 | Japan . | |
| 63-053922 | 4/1988 | Japan . | |
| 63-062621 | 4/1988 | Japan . | |
| 3-48017 | 3/1991 | Japan ..................................... | 384/291 |
| 4-063809 | 5/1992 | Japan . | |

*Primary Examiner*—Thomas R. Hannon
*Attorney, Agent, or Firm*—Browdy and Neimark

[57] ABSTRACT

A sliding bearing of a cylindrical shape which bearing is adapted to support a rotation shaft through a lubricant film, comprising a plurality of fine grooves juxtaposed on an inner peripheral face of said sliding bearing in a circumferential direction of the bearing, each of said grooves extending from a backward position of a minimum lubricant film thickness portion at which the lubricant film becomes minimum in thickness on the rotation of said shaft, to a forward position of said minimum lubricant film thickness portion.

18 Claims, 6 Drawing Sheets

SLIDING BEARING

BACKGROUND OF THE INVENTION

The invention relates to a sliding bearing for supporting a rotation shaft.

A sliding bearing for rotatably supporting a rotation shaft, for example, a crank shaft etc. in an internal combustion engine is provided with a structure in which two bearing metal pieces of semicylindrical shape are combined along an inner periphery of a housing into a cylindrical shape. In the structure there is fed a lubricant oil between the inner peripheral face of each of the bearing metal pieces and the rotation shaft so that a lubricant film may be formed therebetween. By the lubricating and cooling effects of the lubricant oil, wear and seizure are restrained, and another effect of restraining noise is also brought about from the cushion function of the lubricant oil. The thicker the thickness of the lubricant film is and/or the more the amount of the lubricant oil is, the more the restraining effects become.

There are many conventional bearings in each of which a lot of fine grooves of several microns in depth are formed to be juxtaposed in an circumferential direction on an inner peripheral face of the bearing, so that the inner peripheral face is made to have an uneven surface in an axial direction. By means of lubricant oil contained in the fine grooves, the quantity of the lubricant oil is made to increase. For example, in JP-A-59-73620 Publication (prior art 1) there is disclosed a sliding bearing in which many fine grooves are formed to extend at an inclination angle of 0 to about 5° regarding a circumferential direction while being spaced equidistantly apart from each other in an axial direction, by which structure it becomes possible to feed much lubricant oil in the fine grooves and to promote the dissipation of heat. In each of JP-U-63-53922 Publication (prior art 2) and JP-U-63-62621 Publication (prior art 3) there is disclosed a sliding bearing in which fine grooves extending on the inner peripheral face of the sliding bearing in the circumferential direction thereof are made to have a larger pitch in each of axially terminal end portions than that in an axially inner portion. By this structure it becomes possible to decrease the number of the fine grooves in the terminal end portions where misalignment occurs in relation to a rotation shaft supported by the bearing, and the decrease in area for supporting shaft load, which decrease is caused because of the providing of the fine grooves, can be restrained as little as possible to thereby make specific load onto the load-supporting area smaller, so that the lowering of endurance of the bearing is restrained. In JP-U-4-63809 Publication (prior art 4) there is disclosed a sliding bearing in which fine grooves are circumferentially formed only on crush reliefs which are provided in both circumferential ends of each of bearing metal pieces. By this structure in which the side of the fine grooves acts as dams, it is possible to restrain lubricant oil from flowing outwardly and to restrain oil feed pressure from being lowered.

In each of the prior arts, the inner peripheral face is made to be uneven (,i.e, not flat) in an axial direction so that the side of the fine grooves acts as dams for restraining the axial effluence of the lubricant oil, whereby the effluence of the lubricant oil and the lowering of the oil-feeding pressure are restrained while promoting the dissipation of heat. However, the forming of the fine grooves on the inner peripheral face makes the shaft load concentrated on convex portions defined between the fine grooves, with the result that wear resistance is lowered. Even in the cases of the prior arts 2 and 3 where the number of the fine grooves is decreased only in the end portions onto which more load is applied due to the misalignment of a rotation shaft, the lowering of the wear resistance can not be prevented.

SUMMARY OF THE INVENTION

The object of the present invention is to obtain a sliding bearing superior in wear resistance and seizure resistance by making a lubricant film thicker in thickness at a portion in which the lubricant film of the sliding bearing becomes minimum in thickness, that is, at a portion of minimum lubricant film thickness (Hmin.)

According to the first aspect of the invention, a sliding bearing comprises a plurality of fine grooves extending from the backward portion of the minimum lubricant film thickness (Hmin.) portion to the forward portion of the Hmin. portion, which fine grooves are juxtaposed in a circumferential direction. The terms "forward portion" and "backward portion" used herein mean a side from which the lubricant flows into the Hmin. and another side to which the lubricant flows out of the Hmin., respectively.

According to the second aspect of the invention, a sliding bearing comprises bearing metal pieces combined to have a cylindrical shape, fine grooves being formed on one of the bearing metal pieces in which one the minimum lubricant film thickness (Hmin.) portion exists.

In explaining the function brought about from the structure of the bearing while referring to FIG. 1 in which the fine grooves are emphasized, the sliding bearing which is lubricated hydrodynamically by lubricant oil has two bearing metal pieces 1 and 2 combined into a cylindrical shape which bearing metal pieces are mounted in a housing 3, the lubricant oil being fed between the bearing metal pieces 1 and 2 and a rotation shaft 4. In FIG. 1 the rotation shaft 4 is rotated clockwise as shown by arrow X. In this case, due to load applied to the rotation shaft 4 from a driving system, the rotation shaft 4 is eccentric regarding the inner faces of the bearing metal pieces 1 and 2, and it has been known that, by the value of the minimum lubricant film thickness (Hmin.) occurring at the portion A at which the lubricant oil become minimum in thickness, bearing characteristics of the sliding bearing such as wear resistance, seizure resistance and etc. are settled. The minimum lubricant film thickness portion (A) is settled by operation conditions, and the location of the minimum lubricant film thickness portion (A) can be settled beforehand. In a state where the rotation shaft is rotated while being fed with lubricant oil, the lubricant oil supplied from a feed opening (not shown) flows into a clearance defined between the bearing metal piece 1 and the rotation shaft 4, as shown by arrow (a), along the fine grooves formed in a circumferential direction of the inner peripheral face of the metal piece 1. The fine grooves 6 are formed to extend to the forward position of the minimum lubricant film thickness (Hmin.) portion and are terminated at an end 6a. The lubricant oil 5 overflows, as shown in FIG. 2, beyond the terminal face of the end 6a of the fine grooves because of the viscosity thereof, and is forced into the clearance defined between the bearing metal piece 1 and the rotation shaft 4, as shown by arrow (b). By the pressure of the flowing lubricant oil, the rotation shaft 4 is radially pushed up and the Hmin. becomes thicker in thickness. Further, since the Hmin. portion is provided with no fine groove and is formed to be a flat inner face, the shaft load is supported by the large area of the whole face of the Hmin. portion.

According to the third aspect of the invention, the sliding bearing comprises fine grooves each having a groove width of such a converging shape as the cross-sectional area of the groove gradually decreases toward the Hmin. portion or each having such a groove depth as to gradually decrease toward the Hmin. portion, so that the pressure of the lubricant oil in the fine grooves rises as it approaches the ends of the fine grooves, and the effect of raising the Hmin. becomes large.

According to the fourth aspect of the invention, the sliding bearing of the invention comprises fine grooves each formed in a spiral shape along the inner peripheral face. The spiral grooves can be readily formed through one or a plurality of cutting tools by boring process.

According to the fifth aspect of the invention, the sliding bearing of the invention comprises fine grooves each formed in a circumferential direction of the inner peripheral face which direction traverses the axial direction.

According to the sixth aspect of the invention, the sliding bearing of the invention comprises fine grooves of any one of the first to fifth aspects of the invention which fine grooves are formed in an axially inner portion, and other fine grooves formed in both of axially terminal end portions which fine grooves extend along the whole circumferential portion defined between the right and left crush reliefs of a metal piece. In this structure, by means of the fine grooves formed at the axially inner portion, the pressure of the lubricant oil forced into a clearance between the rotation shaft and the bearing is increased, and the lubricant oil is restrained from flowing out axially by the other fine grooves formed at the axially terminal end portions, whereby the ability of forming the lubricant film can be further enhanced.

As explained above, according to the first to sixth aspects of the invention, the sliding bearing comprises fine grooves extending to the forward position of the Hmin. portion which fine grooves are juxtaposed circumferentially, whereby it becomes possible to make the Hmin. thicker in thickness and to obtain superior wear resistance and superior anti-seizure property.

DESCRIPTION OF THE PREFERRED EMBODIMENTS OF THE INVENTION

Figure 1:
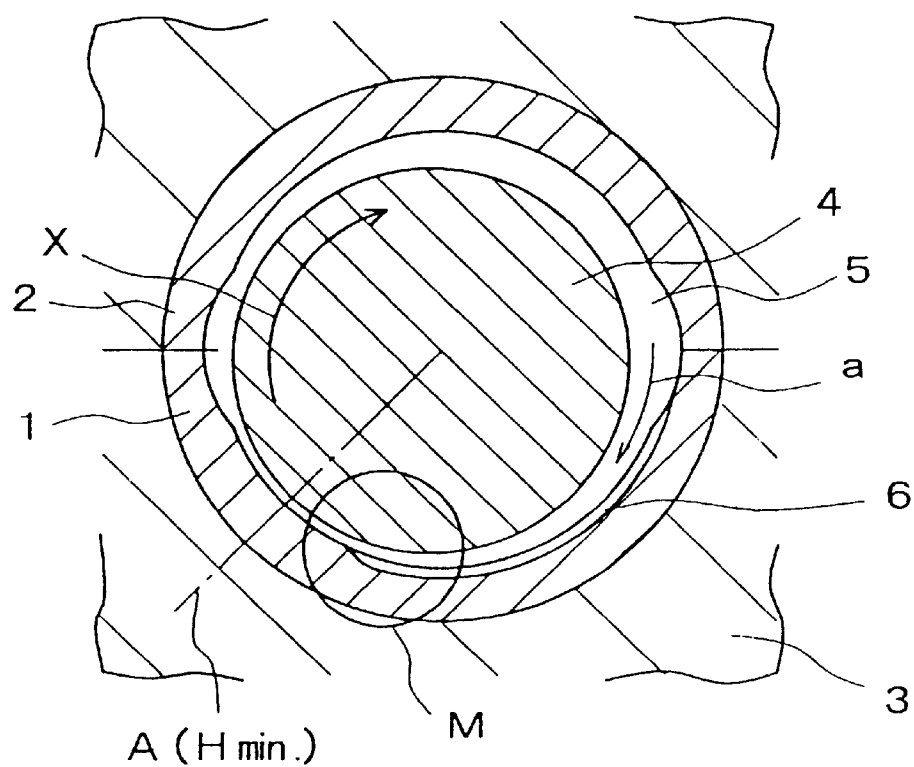
FIG. 1 is a cross-sectional view of a sliding bearing embodying the present invention.
Figure 2:
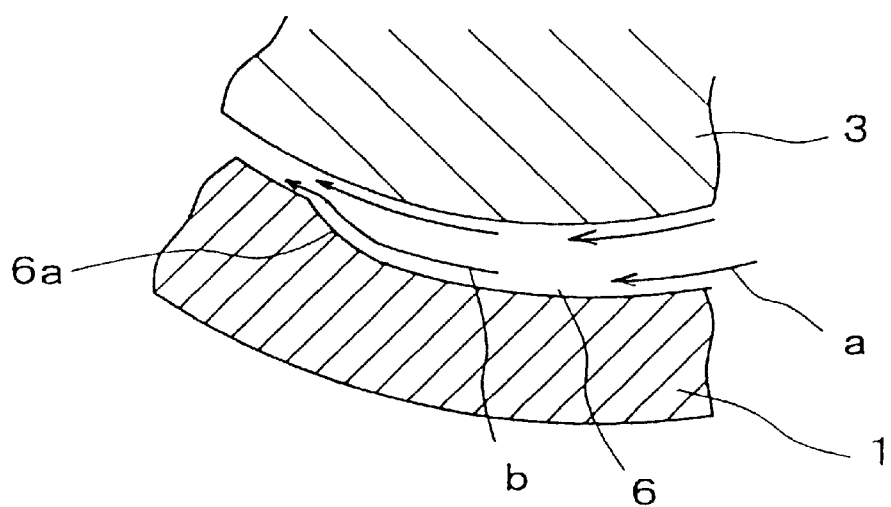
FIG. 2 is a partially enlarged view of a portion (M) shown in FIG. 1.

The embodiments of the invention are explained below while referring to the drawings showing a case where a rotation shaft 4 rotating clockwise is supported.

Figure 3:
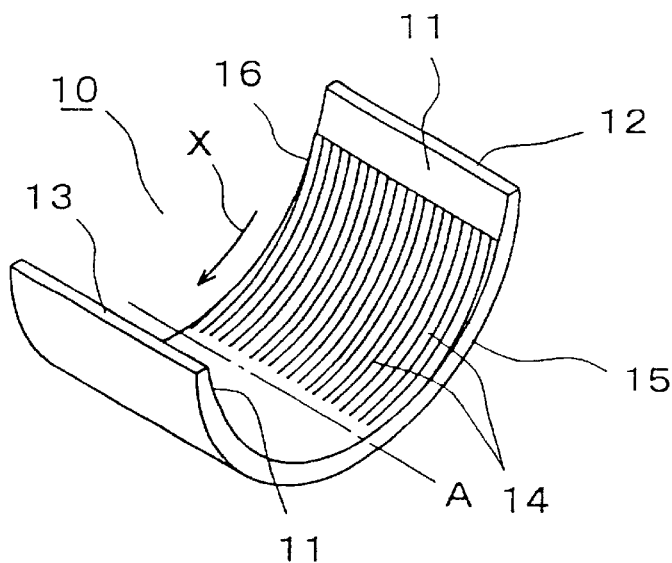
FIG. 3 is a perspective view showing a bearing metal piece in a sliding bearing of the first embodiment of the invention.
Figure 4:
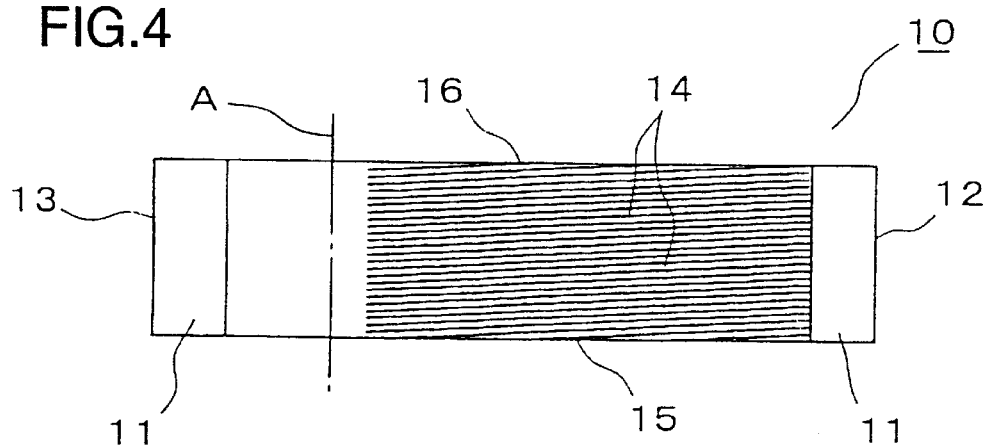
FIG. 4 is a development view of the bearing metal piece of FIG. 3.
Figure 5:
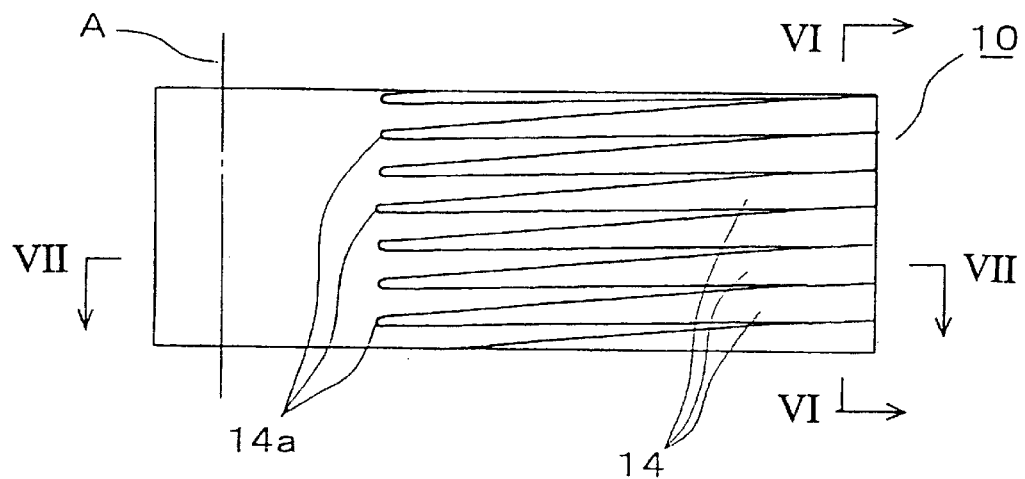
FIG. 5 is a partially enlarged view showing in detail fine grooves in FIG. 4.
Figure 6:
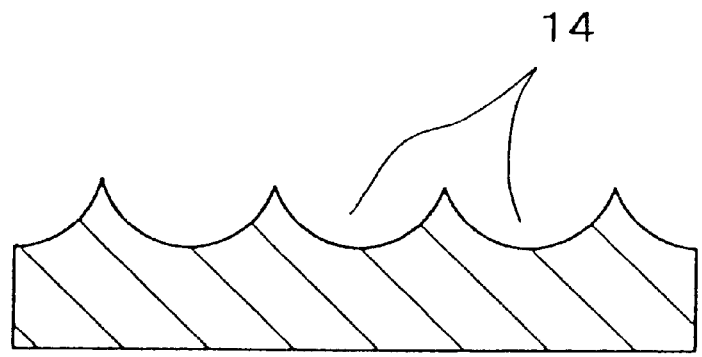
FIG. 6 is a sectional view taken along line VI—VI in FIG. 5.
Figure 7:
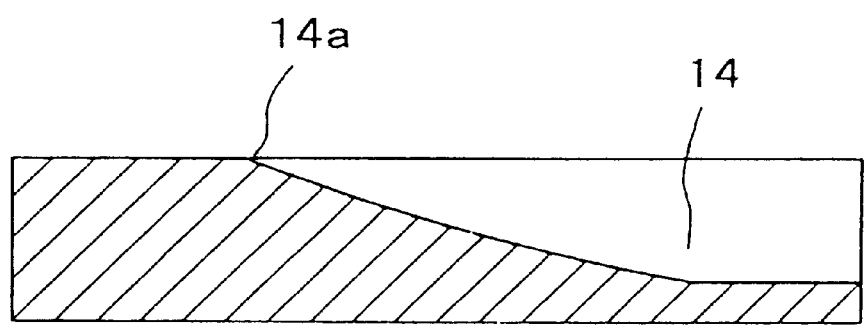
FIG. 7 is a sectional view taken along line VII—VII in FIG. 5.

FIGS. 3 to 7 show a bearing metal piece 10 forming a sliding bearing of the first embodiment of the invention, which bearing metal piece 10 had a semi-cylindrical shape as a whole as shown in FIGS. 3 and 4. At each of the circumferentially right and left ends 12 and 13 of the bearing metal piece 10 there was provided crush relief 11. In the bearing metal piece 10 there was a portion (A) of minimum lubricant film thickness (Hmin.), which Hmin. portion (A) was located at the position of about 130° from the right end 12 in relation to the driving condition of the rotation shaft 4 supported by the bearing metal piece 10, as shown in FIG. 4. On the inner peripheral face of the bearing metal piece 10 there were formed fine grooves 14 extending from the end of the right crush relief 11 to a position short of the Hmin. portion (A). The fine grooves 14 were tilted about 3° regarding the circumferential direction of the bearing metal piece 10, the fine grooves being formed in parallel to each other through boring process by use of one cutting tool so that each of the fine grooves had a spiral shape, the fine grooves being disposed on an area defined between the axially forward and backward ends 15 and 16 of the bearing metal piece 10. The depth of each of the fine grooves 14 was about 10 μm, the pitch of the fine grooves being about 0.25 mm. In one example of the first embodiment, each of the fine grooves 14 was provided with a U-shaped cross-section as shown in FIG. 6, and the width and depth of each of the fine grooves were formed to have such a tapered shape as to become gradually small in depth and width toward the end 14a thereof as shown in FIGS. 5 and 7. Thus, the cross-sectional area of each of the fine grooves 14 decreased gradually toward the end 14a.

Figure 8:
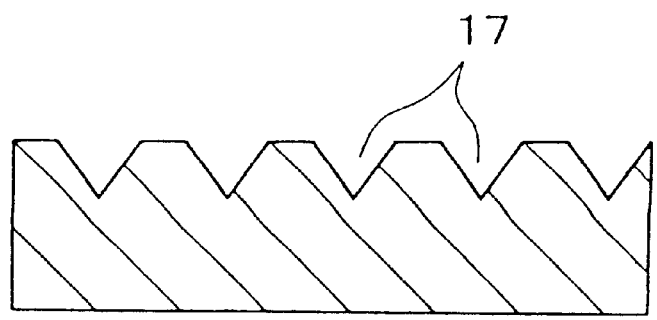
FIG. 8 is a partially enlarged sectional view showing another example of fine grooves.
Figure 9:
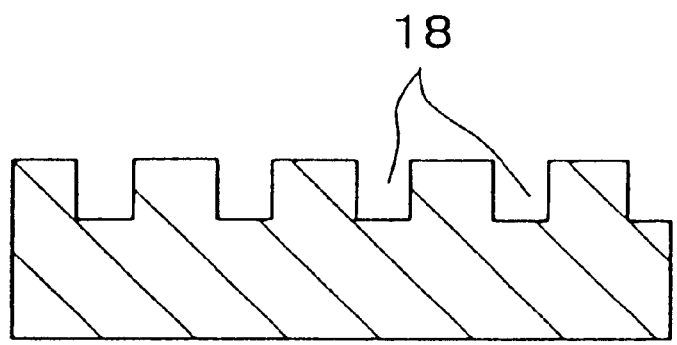
FIG. 9 is a partially enlarged sectional view showing still another example of fine grooves.
Figure 10:
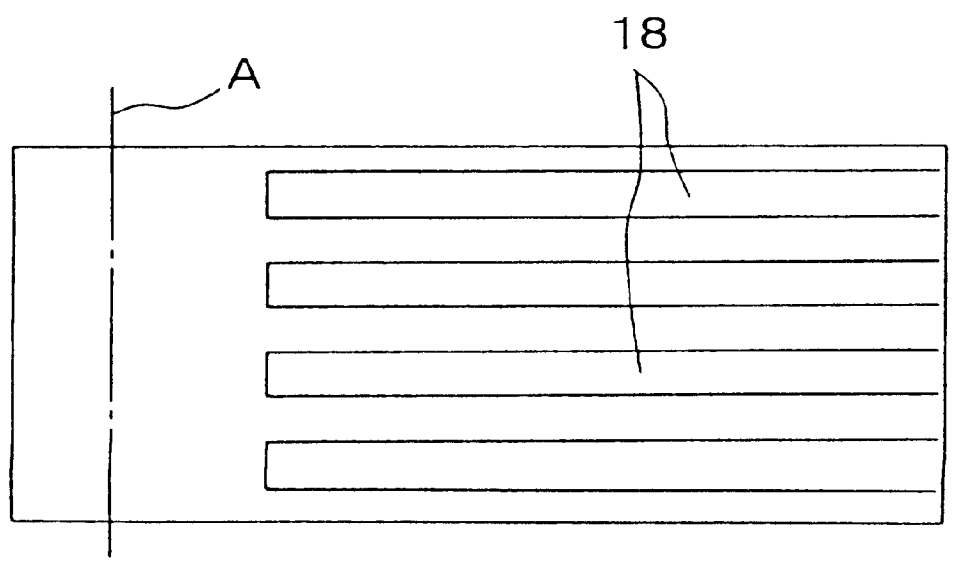
FIG. 10 is a partially enlarged plane view showing the fine grooves of FIG. 9.

In another example of the first embodiment, the cross-sectional shape of the fine grooves had a V-shape as shown in FIG. 8, and in still another example of the first embodiment, the cross-sectional shape of the fine grooves had an angular shape as shown in FIGS. 9 and 10. Further, the depth and pitch of the fine grooves may be selected suitably.

Figure 11:
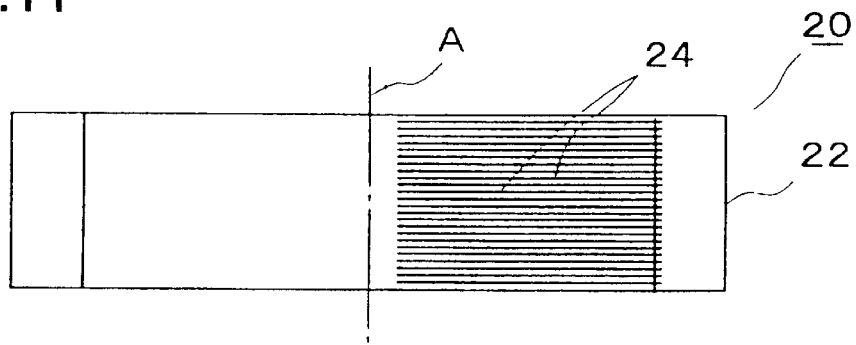
FIG. 11 is a development view showing an example of a bearing metal piece in the second embodiment of the invention.
Figure 12:
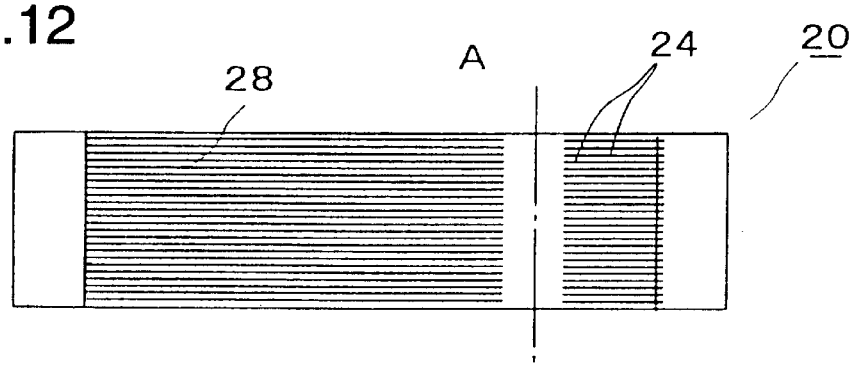
FIG. 12 is a development view showing another example of the bearing metal piece in the second embodiment of the invention.

FIGS. 11 to 14 show other embodiments of the sliding bearings of the invention. FIG. 11 shows a second embodiment of the sliding bearing 20, in which the Hmin. portion (A) existed at the position of about 90° from the right end 22 in relation to the driving condition of the rotation shaft 4 supported by the sliding bearing. In this case, the fine grooves 24 were formed to extend from the end of the right crush relief to the position of about 80° from the right end 22. In another case where the Hmin. portion (A) was located at an angle less than 90° from the right end 22, the fine grooves were formed to extend to the position of an angle smaller about 10° than the angle of the Hmin. portion (A)

when the former angle was measured from the right end 22. In this case where the Hmin. portion (A) existed at the position of the angle less than 90° from the right end 22, the second fine grooves were also formed at the left side of the Hmin. portion (A) as shown in FIG. 12, by which second fine grooves 28 the lubricant oil was further restrained from flowing out axially.

Figure 13:
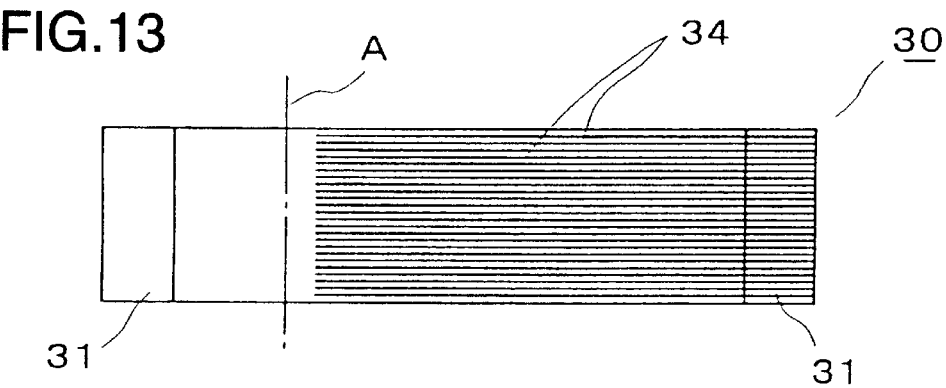
FIG. 13 is a development view showing an example of a bearing metal piece in the third embodiment of the invention.

FIG. 13 shows a bearing metal piece 30 of a sliding bearing of the third embodiment, in which many fine grooves 34 were formed to extend through a right crush relief 31 to a position short of the Hmin. portion (A) while being disposed in parallel with each other in the circumferential direction vertical to the axial direction of the metal piece.

Figure 14:
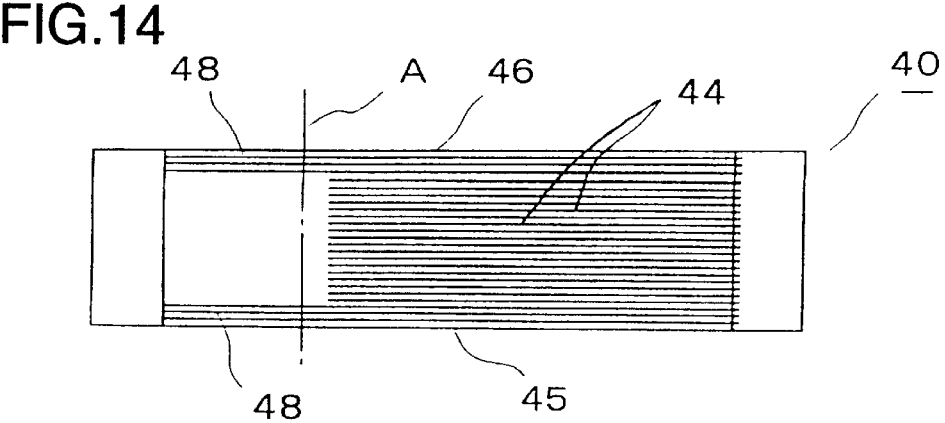
FIG. 14 is a development view showing another example of the bearing metal piece in the third embodiment of the invention.

FIG. 14 shows a bearing metal piece 40 of a sliding bearing of the fourth embodiment, in which metal piece 40 the first fine grooves 44 were formed in an axially inner portion and the second fine grooves 48 (as in the sixth aspect of the invention) were formed in the axially forward and backward ends 45 and 46 of the metal piece so that the fine grooves 48 extended on the whole circumferentially inner peripheral face of the ends with the exception of the crush reliefs. By the fine grooves 44 formed in the inner portion, the pressure of the lubricant oil flowing into the clearance between the rotation shaft and the bearing metal piece was enhanced, and the lubricant oil was restrained from flowing out axially by the second fine grooves 48 formed in the ends 45 and 46, whereby the ability of forming the lubricant film was able to be further enhanced.

In the bearing metal piece where the Hmin. portion (A) existed, the fine grooves disclosed in any one of the embodiments 1 to 4 were formed. However, in another bearing metal piece paired with the Hmin. portion-provided bearing metal piece, the third fine grooves may be formed on the whole circumferential inner peripheral face, by which it becomes possible to feed much amount of lubricant oil through the third fine grooves and to provide a dam-like function for restraining the lubricant oil from flowing out axially, whereby the ability of forming the lubricant film can be further enhanced. Further, in still another case where fine grooves are formed only on the inner peripheral face of one of the two bearing metal pieces paired with each other in which one the Hmin. portion (A) exists, the cost of forming the fine grooves on the other bearing metal piece can be saved, whereby it becomes possible to reduce the cost of a sliding bearing.

Figure 15:
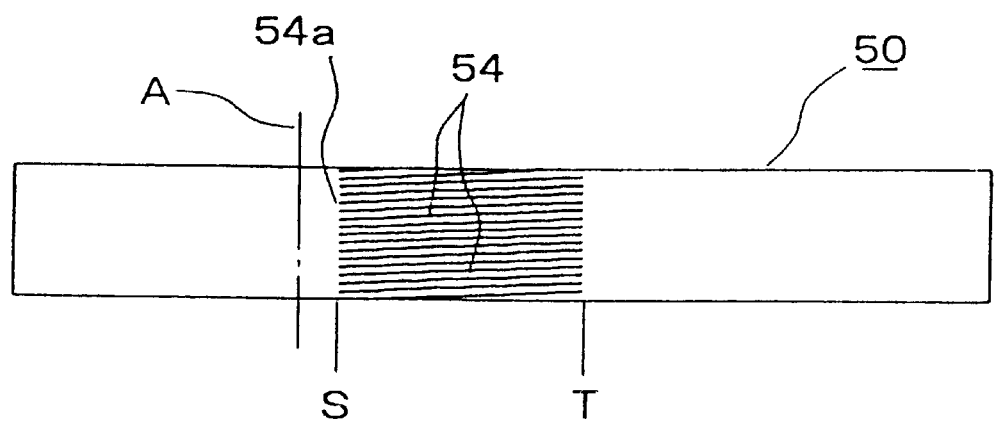
FIG. 15 is a development view showing an example of a bearing metal piece having a cylindrical shape.

In the embodiments, each of the sliding bearings was formed by two bearing metal pieces paired with each other, however, a sliding bearing 50 disclosed in FIG. 15 is an example of one-piece type which was formed by plastically working one piece of bearing material sheet into a cylindrical shape corresponding to the shape of the sliding bearing. In the sliding bearing 50, in a case where a rotation shaft was rotated clockwise (in the direction (X) in FIG. 1), fine grooves 54 were formed to be juxtaposed circumferentially from the backward position (T) (in the right side of FIG. 15) of the Hmin. portion (A) to the forward position (S) thereof (in the right side of FIG. 15) in an angular range of about 90°. Similarly to the cases of the fine grooves disclosed in FIGS. 5 to 7, the fine grooves 54 were formed spirally through boring process by use of one cutting tool while being tilted 3° regarding the circumferential direction of the bearing metal piece, the depth and the groove pitch of the fine grooves being about 10 μm and about 0.25 mm, respectively. The cross-section of each of the fine grooves 54 was formed to have a U-shape, and the depth and width thereof were made to be gradually converged (,that is, tapered), so that the cross-sectional area of each of the fine grooves 54 was decreased gradually toward the end 54a of each of the fine grooves.

Figure 16:
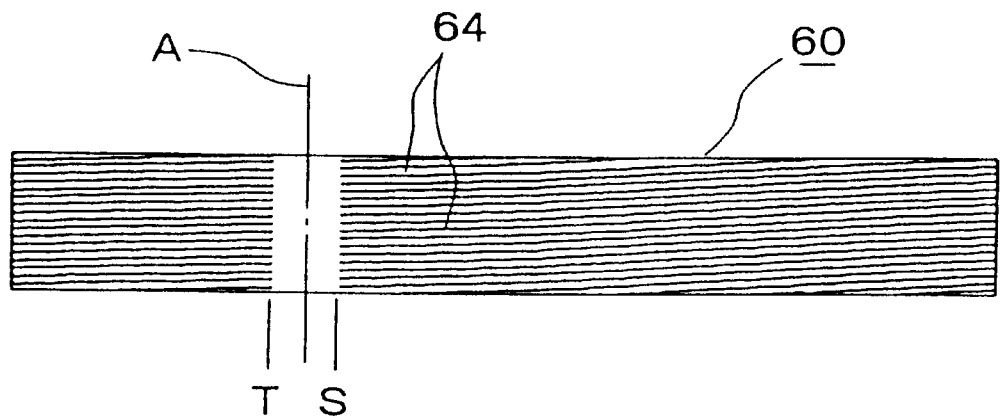
FIG. 16 is a development view showing another example of the bearing metal piece having a cylindrical shape.

In a sliding bearing disclosed in FIG. 16, fine grooves 64 corresponding to the fine grooves 54 formed in the sliding bearing 50 in FIG. 15 were formed to be juxtaposed circumferentially from the backward position (T) (in the left side of FIG. 16) of the Hmin. portion (A) to the forward position (S) thereof (in the right side of FIG. 16) in an angular range of about 340°, and no fine groove was formed in another angular range of about 20° in which the Hmin. portion (A) was included.

In the embodiments explained above the sliding bearings are described in connection with the rotation shaft rotated clockwise. However, in another case where the rotation shaft is rotated counterclockwise, sliding bearings can be made of one or two bearing metal pieces each provided at the left side with the same structure as that of the right side structure of any one in the above-explained embodiments and vice versa.

What is claimed is:

1. A sliding bearing of a cylindrical shape which bearing is adapted to support a rotation shaft through a lubricant film, comprising a plurality of fine grooves juxtaposed and extended on an inner peripheral face of said sliding bearing in a same circumferential direction of the bearing, each of said grooves extending from a backward position of a minimum lubricant film thickness portion at which the lubricant film becomes minimum in thickness on the rotation of said shaft, to a forward position of said minimum lubricant film thickness portion.

2. A sliding bearing according to claim 1, each of said fine grooves being formed to have a spiral shape along an inner peripheral face of the bearing.

3. A sliding bearing of a cylindrical shape which bearing is adapted to support a rotation shaft through a lubricant film, comprising fine grooves claimed in claim 2 in an axially inner portion of the bearing, and other fine grooves extending circumferentially while traversing said minimum lubricant film thickness portion, said other fine grooves being located at both axial ends of the bearing.

4. A sliding bearing according to claim 1, each of said fine grooves being formed to extend in a direction traversing an axial direction of the inner peripheral face of the bearing.

5. A sliding bearing of a cylindrical shape which bearing is adapted to support a rotation shaft through a lubricant film, comprising fine grooves claimed in claim 4 in an axially inner portion of the bearing, and other fine grooves extending circumferentially while traversing said minimum lubricant film thickness portion, said other fine grooves being located at both axial ends of the bearing.

6. A sliding bearing according to claim 1, each of said fine grooves having depth gradually decreased and/or width gradually decreased so that a cross-sectional area of each of said fine grooves is gradually decreased toward said minimum lubricant film thickness portion.

7. A sliding bearing of a cylindrical shape which bearing is adapted to support a rotation shaft through a lubricant film, comprising fine grooves claimed in claim 6 in an axially inner portion of the bearing, and other fine grooves extending circumferentially while traversing said minimum lubricant film thickness portion, said other fine grooves being located at both axial ends of the bearing.

8. A sliding bearing according to claim 6, each of said fine grooves being formed to extend in a direction traversing an axial direction of the inner peripheral face of the bearing.

9. A sliding bearing according to claim 6, each of said fine grooves being formed to have a spiral shape along an inner peripheral face of the bearing.

10. A sliding bearing of a cylindrical shape which bearing is adapted to support a rotation shaft through a lubricant film, comprising fine grooves claimed in claim 9 in an axially inner portion of the bearing, and other fine grooves extending circumferentially while traversing said minimum lubricant film thickness portion, said other fine grooves being located at both axial ends of the bearing.

11. A sliding bearing of a cylindrical shape which bearing is adapted to support a rotation shaft through a lubricant film, comprising a plurality of fine grooves juxtaposed on an inner peripheral face of said sliding bearing in a circumferential direction of the bearing, each of said grooves extending from a backward position of a minimum lubricant film thickness portion at which the lubricant film becomes minimum in thickness on the rotation of said shaft, to a forward position of said minimum lubricant film thickness portion, said bearing further comprising a plurality of bearing metal pieces assembled to have said cylindrical shape, said fine grooves being provided in a bearing metal piece in which said minimum lubricant film thickness portion exists on the rotation of said shaft.

12. A sliding bearing of a cylindrical shape which bearing is adapted to support a rotation shaft through a lubricant film, comprising fine grooves claimed in claim 11 in an axially inner portion of the bearing, and other fine grooves extending circumferentially while traversing said minimum lubricant film thickness portion, said other fine grooves being located at both axial ends of the bearing.

13. A sliding bearing according to claim 11, each of said fine grooves being formed to have a spiral shape along an inner peripheral face of the bearing.

14. A sliding bearing according to claim 11, each of said fine grooves being formed to extend in a direction traversing an axial direction of the inner peripheral face of the bearing.

15. A sliding bearing of a cylindrical shape which bearing is adapted to support a rotation shaft through a lubricant film, comprising fine grooves claimed in claim 14 in an axially inner portion of the bearing, and other fine grooves extending circumferentially while traversing said minimum lubricant film thickness portion, said other fine grooves being located at both axial ends of the bearing.

16. A sliding bearing according to claim 11, each of said fine grooves having depth gradually decreased and/or width gradually decreased so that a cross-sectional area of each of said fine grooves is gradually decreased toward said minimum lubricant film thickness portion.

17. A sliding bearing according to claim 16, each of said fine grooves being formed to have a spiral shape along an inner peripheral face of the bearing.

18. A sliding bearing of a cylindrical shape which bearing is adapted to support a rotation shaft through a lubricant film, comprising a plurality of fine grooves in an axially inner portion of the bearing, extending in a circumferential direction of the bearing, each of said grooves extending from a backward position of a minimum lubricant film thickness portion at which the lubricant film becomes minimum in thickness on the rotation of said shaft, to a forward position of said minimum lubricant film thickness portion, and other fine grooves extending circumferentially while traversing said minimum lubricant film thickness portion, said other fine grooves being located at both axial ends of the bearing.

* * * * *